(12) United States Patent
Burns et al.

(10) Patent No.: US 9,444,784 B2
(45) Date of Patent: *Sep. 13, 2016

(54) APPARATUS AND METHOD OF PEER-TO-PEER COMMUNICATION

(75) Inventors: Gregory Burns, Seattle, WA (US); Jack H. Profit, Seattle, WA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/448,788

(22) Filed: Apr. 17, 2012

(65) Prior Publication Data

US 2012/0203916 A1 Aug. 9, 2012

Related U.S. Application Data

(63) Continuation of application No. 12/898,373, filed on Oct. 5, 2010.

(60) Provisional application No. 61/286,604, filed on Dec. 15, 2009.

(51) Int. Cl.
*G06F 15/16* (2006.01)
*H04L 29/12* (2006.01)
*H04L 29/08* (2006.01)

(52) U.S. Cl.
CPC ......... *H04L 61/256* (2013.01); *H04L 29/1249* (2013.01); *H04L 67/14* (2013.01); *H04L 67/142* (2013.01)

(58) Field of Classification Search
CPC .............. H04W 76/025; H04W 92/18; H04L 29/12528; H04L 61/2575; H04L 65/1069; H04L 29/1249; H04L 61/256
USPC .................... 709/204, 226–229, 245
See application file for complete search history.

(56) References Cited

U.S. PATENT DOCUMENTS 6,810,033 B2 * 10/2004 Derks ........................... 370/352
6,907,034 B1 * 6/2005 Begis ........................... 370/354

(Continued)

FOREIGN PATENT DOCUMENTS

CN 101222551 A 7/2008
GB 2355886 A 5/2001

(Continued)

OTHER PUBLICATIONS

Rosenberg, J., "Interactive Connectivity Establishment (ICE): A Methodology for Network Address Translator (NAT) Traversal for Offer/Answer Protocols draft-ietf-mmusic-ice-15", Cisco, Mar. 26, 2007.*

(Continued)

*Primary Examiner* — Madhu Woolcock
(74) *Attorney, Agent, or Firm* — Neugeboren O'Dowd PC

(57) ABSTRACT

An apparatus and method of communication include establishing, by a first communication device, a proximity-based connection with a another communication device, transmitting a first public network address of the first communication device over the proximity-based connection, receiving a second public network address of another communication device over the proximity-based connection, and establishing a communication session over a wide area connection using the first public network address and the second public network address.

23 Claims, 6 Drawing Sheets

(56) References Cited

U.S. PATENT DOCUMENTS

| | | | |
|---|---|---|---|
| 6,961,573 B1 | 11/2005 | Moon et al. | |
| 7,111,035 B2* | 9/2006 | McClellan et al. | 709/201 |
| 7,187,923 B2* | 3/2007 | Mousseau et al. | 455/416 |
| 7,237,004 B2* | 6/2007 | Slobodin et al. | 709/204 |
| 7,526,252 B2* | 4/2009 | Rekimoto et al. | 455/41.2 |
| 7,725,584 B1 | 5/2010 | Hanmann et al. | |
| 7,756,097 B2* | 7/2010 | Uehara et al. | 370/342 |
| 7,817,606 B2* | 10/2010 | Lin | 370/338 |
| 7,925,212 B2* | 4/2011 | Eisenbach | 455/41.2 |
| 7,986,655 B2* | 7/2011 | Joo | 370/328 |
| 7,996,463 B2* | 8/2011 | Mousseau et al. | 709/204 |
| 2002/0147819 A1 | 10/2002 | Miyakoshi et al. | |
| 2003/0112789 A1* | 6/2003 | Heinonen et al. | 370/349 |
| 2003/0179773 A1 | 9/2003 | Mocek et al. | |
| 2003/0181211 A1 | 9/2003 | Razavilar et al. | |
| 2004/0028009 A1* | 2/2004 | Dorenbosch | H04W 36/0011 370/329 |
| 2004/0125762 A1* | 7/2004 | Haller et al. | 370/313 |
| 2004/0131061 A1* | 7/2004 | Matsuoka et al. | 370/392 |
| 2004/0148405 A1* | 7/2004 | Nakamoto | 709/228 |
| 2004/0209614 A1* | 10/2004 | Bright et al. | 455/426.1 |
| 2007/0025367 A1* | 2/2007 | Wijnands | 370/401 |
| 2007/0076695 A1* | 4/2007 | Chu et al. | 370/352 |
| 2007/0147399 A1* | 6/2007 | Deng et al. | 370/401 |
| 2007/0274270 A1* | 11/2007 | Jones et al. | 370/338 |
| 2007/0274271 A1* | 11/2007 | Jones et al. | 370/338 |
| 2008/0013539 A1* | 1/2008 | Poyhonen et al. | 370/390 |
| 2008/0212764 A1* | 9/2008 | Fukuta et al. | 379/211.02 |
| 2008/0215754 A1* | 9/2008 | Belimpasakis et al. | 709/245 |
| 2008/0304419 A1 | 12/2008 | Cooper et al. | |
| 2009/0113067 A1 | 4/2009 | Andreasen | |
| 2009/0274146 A1* | 11/2009 | Zhu | 370/352 |
| 2010/0057929 A1* | 3/2010 | Merat et al. | 709/231 |
| 2010/0180028 A1 | 7/2010 | Deason | |
| 2010/0205653 A1* | 8/2010 | Eronen et al. | 726/3 |
| 2010/0217874 A1* | 8/2010 | Anantharaman | H04L 29/12528 709/228 |
| 2010/0268763 A1* | 10/2010 | Rasanen | 709/203 |
| 2010/0268838 A1* | 10/2010 | Hong et al. | 709/231 |
| 2010/0293297 A1* | 11/2010 | Perumal et al. | 709/245 |
| 2011/0075673 A1* | 3/2011 | Hardie et al. | 370/401 |
| 2011/0145397 A1 | 6/2011 | Burns et al. | |

FOREIGN PATENT DOCUMENTS

| | | |
|---|---|---|
| JP | 2002359623 A | 12/2002 |
| JP | 2005223722 A | 8/2005 |
| JP | 2007166189 A | 6/2007 |
| JP | 2008306726 A | 12/2008 |
| WO | WO2007019877 A1 | 2/2007 |

OTHER PUBLICATIONS

Albrecht, M., et al., " IP Services over Bluetooth: Leading the Way to a New Mobility", Proceedings of the Conference on Local Computer Networks, Oct. 1999.*

Baatz, S. et al., "Handoff Support for Mobility With IP over Bluetooth," Proceedings of the 25th Annual Conference on Local Computer Networks (LCN '00), pp. 143-154, Tampa, Florida, Nov. 2000, IEEE, Inc.*

International Preliminary Report on Patentability—PCT/US2010/056046, The International Bureau of WIPO—Geneva, Switzerland—Mar. 8, 2012.

International Search Report and Written Opinion—PCT/US2010/056046, International Search Authority—European Patent Office—Jan. 3, 2011.

Rosenberg Dynamicsoft J: "Interactive Connectivity Establishment (ICE): A Methodology for Network Address Translator (NAT) Traversal for the Session Initiation Protocol (SIP) draft-rosenberg-sipping-ice-00; draft-rosenberg-sipping-ice-00.txt", IETF Standard-Working-Draft, Internet Engineering Task Force, IETF, CH, Feb. 24, 2003, XP015005077, ISSN: 0000-0004.

Translation of Notice of Reasons for Rejection Dated Jul. 23, 2013 From the Japanese Intellectual Property Office, Patent Application No. 2012-543120.

* cited by examiner

APPARATUS AND METHOD OF PEER-TO-PEER COMMUNICATION

RELATED APPLICATIONS

The present Application for Patent is a continuation of U.S. patent application Ser. No. 12/898,373 entitled "Apparatus and Method of Peer-to-Peer Communication," filed Oct. 5, 2010, which claims priority to Provisional Application No. 61/286,604 entitled "Apparatus And Method Of Peer-To-Peer Communication" filed Dec. 15, 2009, and is assigned to the assignee hereof. Both of these applications are hereby expressly incorporated by reference herein.

BACKGROUND

1. Field

The described aspects relate to communications, and more particularly, to peer-to-peer communications.

2. Background

Communication devices are often able to discover one another and establish a proximity-based connection, such as two peer devices using protocols such as Bluetooth®, Peanut®, Zigbee®, or any other short range communication and service discovery mechanism.

Two or more devices connected by such a proximity-based connection, however, may determine that the proximity-based connection is not desired or is not suitable for further communication.

Thus, improved apparatus and methods of communication are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of peer-to-peer communication by a peer device includes establishing, by a first peer device, a proximity-based connection with a second peer device. The method also includes transmitting a first public network address of the first peer device over the proximity-based connection for receipt by the second peer device. Further, the method includes receiving a second public network address of the second peer device over the proximity-based connection. Additionally, the method includes establishing a communication session over a wide area connection using the first public network address and the second public network address.

Other aspects, for example, relate to at least one processor having one or more modules configured for performing the acts of the above-noted method. For example, at least one processor may include a first module for establishing a proximity-based connection with a second peer device, and a second module for transmitting a first public network address of the first peer device over the proximity-based connection for receipt by the second peer device. Further, the at least one processor may include a third module for receiving a second public network address of the second peer device over the proximity-based connection, and a fourth module for establishing a communication session over a wide area connection using the first public network address and the second public network address.

Further, in another aspect, a computer program product comprises a computer-readable medium having one or more instructions for causing a computer to perform the acts of the above-noted method. For example, the computer program product may include a computer-readable medium comprising at least one instruction for causing a computer to establish a proximity-based connection with a second peer device, and at least one instruction for causing the computer to transmit a first public network address of the first peer device over the proximity-based connection for receipt by the second peer device. Further, the computer-readable medium may additionally include at least one instruction for causing the computer to receive a second public network address of the second peer device over the proximity-based connection, and at least one instruction for causing the computer to establish a communication session over a wide area connection using the first public network address and the second public network address.

Moreover, another aspect may include a first peer device having means for performing the acts of the above-noted method. For example, the first peer device may include means for establishing a proximity-based connection with a second peer device, and means for transmitting a first public network address of the first peer device over the proximity-based connection for receipt by the second peer device. Also, the first peer device may additionally include means for receiving a second public network address of the second peer device over the proximity-based connection, and means for establishing a communication session over a wide area connection using the first public network address and the second public network address.

In a further aspect, a first peer device may have a processor configured to perform the acts of the above-noted method. For example, the first peer device may include a processor configured to establish a proximity-based connection with a second peer device, and to transmit a first public network address of the first peer device over the proximity-based connection for receipt by the second peer device. Further, the processor of the first peer device may also be configured to receive a second public network address of the second peer device over the proximity-based connection, and to establish a communication session over a wide area connection using the first public network address and the second public network address.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
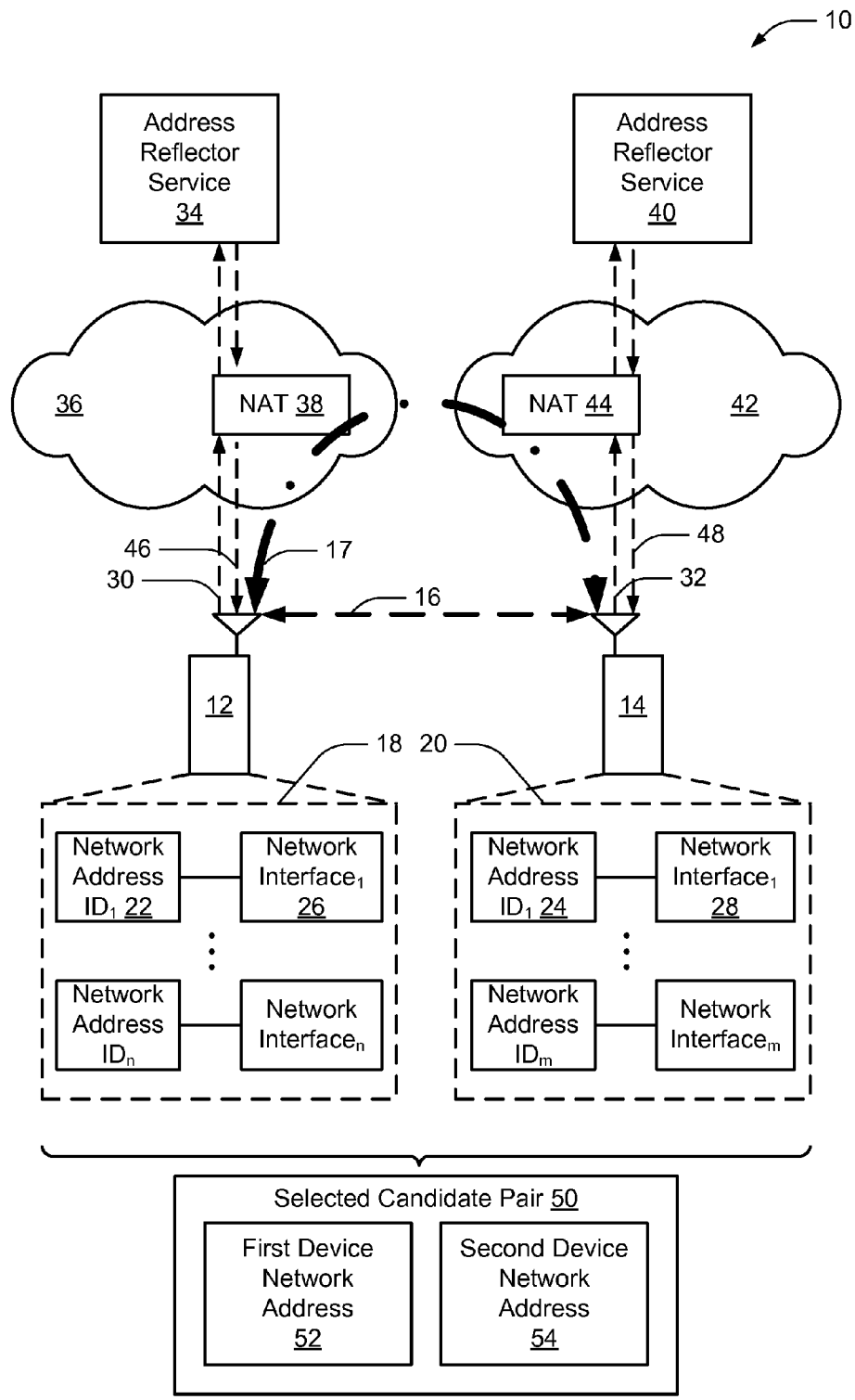
FIG. 1 is a schematic diagram of an aspect of a system of peer-to-peer communication.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects provide apparatus and methods of establishing a wide area connection between at least two communication devices, such as peer devices. The two peer devices may initially discover and communicate with each other using a proximity-based protocol, however, the two peer devices may be unable to establish a wide area connection because they lack the information, such as the appropriate network addresses, for establishing such a connection. For example, if the two devices are in different subnets and attempt to connect using their respective subnet addresses as the origination and destination addresses, the resulting communication attempt will fail, as each subnet address is not recognized in the other subnet.

The described apparatus and method provide for a generation of a candidate list of network addresses, and further for an exchange of the respective candidate lists over the proximity-based connection. Each candidate list includes a plurality of network addresses associated with each network interface of the corresponding peer device. Accordingly, one or both devices can then determine a selected one of the plurality of candidate pairs to utilize in establishing a wide area connection. For example, one or both devices may attempt, for example in an iterative fashion, to connect to the other device using different combinations of the device's own candidate list and the received candidate list from the other device. Furthermore, the attempted combinations of candidates may be optimized based on one or more algorithms. For instance, the generation of the candidate list, or the determination of a selected candidate pair to use in attempting a wide area connection, or both, may include using an Interactive Connection Establishment (ICE) protocol. Once a selected candidate pair is determined, then the apparatus and methods include attempting to establish a wide area connection using the selected candidate pair. If the selected candidate pair is successful, then a wide area connection is established. For example, the wide area connection may be a point-to-point Internet Protocol (IP) connection.

Thus, two peer devices initially connected via a proximity-based connection may alternatively or additionally establish a wide area connection though exchanging candidate lists over the proximity-based connection and determining a selected candidate pair for use in the wide area connection. For example, in one non-limiting aspect, the described aspects and methods may be configured in a Bluetooth profile, which may be stored or obtained by the respective devices. Therefore, the described aspects enable the two peer devices to exchange the candidate lists through an out-of-band (from TCP perspective) proximity-based network, such as Bluetooth®, which removes the need for a centrally administered network component, such as a SIP server, that has to be on the public Internet in order to be seen by both parties.

Referring to FIG. 1, in an aspect, a system of peer-to-peer communication 10 includes a first communication device 12, or first peer (P1) device, and a second communication device 14, or second peer (P2) device, that are configured to discover one another and establish a proximity-based connection 16, and then utilize the proximity-based connection 16 to establish a wide area connection 17.

For example, initially each device 12 or 14 may execute a service discovery protocol and establish proximity-based connection 16 according to one or any combination of proximity-based protocols. For instance, the proximity-based protocols may include, but are not limited to, protocols such as Bluetooth®, Peanut®, Zigbee®, and any other relatively short range communication protocol. In this respect, a short range communication protocol may have a range of equal to or less than about 100 meters, or in other aspects equal to or less than about 75 meters, or in other aspects equal to or less than about 10 meters, or in other aspects equal to or less than about 1 meter, as compared to a wide area or long range communication protocol, which may have a range of greater than about 100 meters, or in other aspects a range of between about 30 meters and about 100 meters. For instance, wide range protocols may include, but are not limited to, protocols such as cellular communication protocols, e.g. CDMA, WCDMA, GSM, etc., wide local area network protocols, WiFi, etc. As such, a short range communication protocol may have a substantially shorter range than a corresponding wide area or long range communication protocol, where such short range versus long range comparisons may include, but are not limited to, Bluetooth® vs. WLAN, or WLAN vs. WWAN, etc. In any case, as proximity-based connection 16 is a direct connection between the two devices, proximity-based connection 16 may be referred to as a peer-to-peer connection.

Further, peer devices 12 and 14 may exchange their respective candidate address lists 18 and 20. Each candidate address list 18 or 20 may include one or more network addresses 22 and 24 for the respective device associated with network interface(s) 26 and 28 of the respective devices. For example, first peer device 12 may have 1 to n network addresses that correspond to 1 to n network interfaces, and second peer device 14 may have 1 to m network addresses that correspond to 1 to m network interfaces, where n and m are positive integers. Further, for example, network interfaces 26 and 28 may include one or more of each of a proximity-based communication interface such as a Bluetooth®, Peanut®, or Zigbee® interface, a WLAN interface such as a WiFi interface, a WWAN interface such as a cellular or whitespace interface, a wired network interface, or any other network connection available to the respective device.

In an aspect, for example, each device 12 and 14 may know a given network address for a given network interface, such as a private IP address on a private network, or the respective device may send a request 30 or 32 to an address reflector service to obtain one or more network addresses, such as a public IP address corresponding to the private IP address. For instance, first device 12 is configured to send request 30 to address reflector service 34 via a first access network 36 and first network address translator (NAT) 38 for first device 12, while second device 14 is configured to send request 32 to address reflector service 40 via a second access network 42 and a second network address translator (NAT) 44 for second device 14. The respective response 46 or 48 includes the respective network address identifier used by the respective address reflector service 34 or 40 to route a communication to the respective device. In some aspects, request 30 or 32, and response 46 or 48, may be part of a connectivity establishment protocol, such as an Interactive Connectivity Establishment (ICE) protocol.

It should be noted that each request 30 or 32 may traverse one or more access networks and one or more NATs to get to the respective address reflector service 34 or 40, and that the respective response 46 or 48 may include one network address, such as the outermost or highest level network address used as a destination by the respective address reflector service or the respective outermost or highest level NAT. In other words, each response 46 or 48 may include a public network address that may be utilized in a communication from outside of the respective access network 36 or 42 to reach the respective device 12 or 14 within the respective access network 36 or 42. Further, it should be noted that each network interface may communicate on a different access network, and as such may send a respective request to a different address reflector service via a different NAT than another respective network interface on the same device.

In any case, devices 12 or 14 may then determine a selected candidate pair 50 for use in establishing wide area connection 17. For example, one or both devices 12 or 14 may execute a connectivity establishment protocol, such as the ICE protocol, to iteratively attempt to establish a connection using respective combinations of a first device network address and a second device network address. Such iterative attempts may be optimized according to one or more algorithms or protocols, such as the ICE protocol. As such, the result of the iteration is selected candidate pair 50 that includes a first device network address 52 and a second device network address 54 determined to enable communication between first peer device 12 and second peer device 14 via wide area connection 17, which may include a point-to-point IP connection.

Accordingly, a communication session may then be established between first peer device 12 and second peer device 14 over wide area connection 17. Wide area connection 17 may be established to replace proximity-based connection 16, or to provide an additional connection to supplement communications. In some aspects, wide area connection 17 has different communication characteristics as compared to proximity-based connection 16, such as a different range, a different throughput or bandwidth, a different quality of service (QoS), a different load, or any other parameter defining the connection or the communication session. In some cases, wide area connection 17 may have a higher or lower value characteristic, while in other cases proximity-based connection 16 may have a higher or lower characteristic. As such, one or both connections may be utilized or established depending on a given communication need or desire. For example, after establishing wide area connection 17, in one aspect proximity-based connection 16 may be released, while in another aspect both wide area connection 17 and proximity-based connection 16 may be maintained. For example, in the case where both wide area connection 17 and proximity-based connection 16 are maintained, and where wide area connection 17 and proximity-based connection 16 have different communication characteristics, each respective communication message between peer devices 12 and 14 may be exchanged via one of wide area connection 17 or proximity-based connection 16 selected based on a match or closest fit of a desired communication characteristic of the communication message, such as a quality of service, and an actual communication characteristic of wide area connection 17 or proximity-based connection 16.

Further, in some aspects, the generation and exchange of candidate address lists 18 and 20, and/or the determination of candidate pair 50 and establishment of wide area connection 17, may be a part of the initial discovery and establishment of proximity-based connection 16. In other aspects, the generation and exchange of candidate address lists 18 and 20, and/or the determination of candidate pair 50 and establishment of wide area connection 17, may be triggered by a user input or a device application input, for example, requesting a communication session or characteristic not available via proximity-based connection 16 or otherwise associated with wide area connection 17. In further aspects, the generation and exchange of candidate address lists 18 and 20, and/or the determination of candidate pair 50 and establishment of wide area connection 17 may be based on a first one of the peer devices receiving a wide area communication request from a second one of the peer devices.

In a further aspect, the generation and exchange of candidate address lists 18 and 20, and/or the determination of candidate pair 50 and establishment of wide area connection 17, are triggered by an inability to establish wide area connection 17 between devices 12 and 14. For example, if devices 12 and 14 are in different subnetworks and exchange their known network addresses for the respective subnetworks, an attempt to establish a wide area connection using the respective subnetwork addresses will fail if both subnetwork addresses are private addresses for use within the respective subnetwork. In other words, the respective subnetwork addresses need to be mapped to a public address in order for a data packet or communication to be routed to the respective device from outside of the respective subnetwork. As such, the generation and exchange process, as well as the establishment of the wide area connection, may be triggered based on determining a failure to establish a wide area or point-to-point IP connection.

Thus, the described apparatus and methods enable a wide area connection between two device by providing for an exchange of network connectivity and NAT traversal information over a proximity-based connection, even when both devices are in different networks, which in the prior art would prevent the two devices from communicating with each other over the wide area connection.

Figure 2:
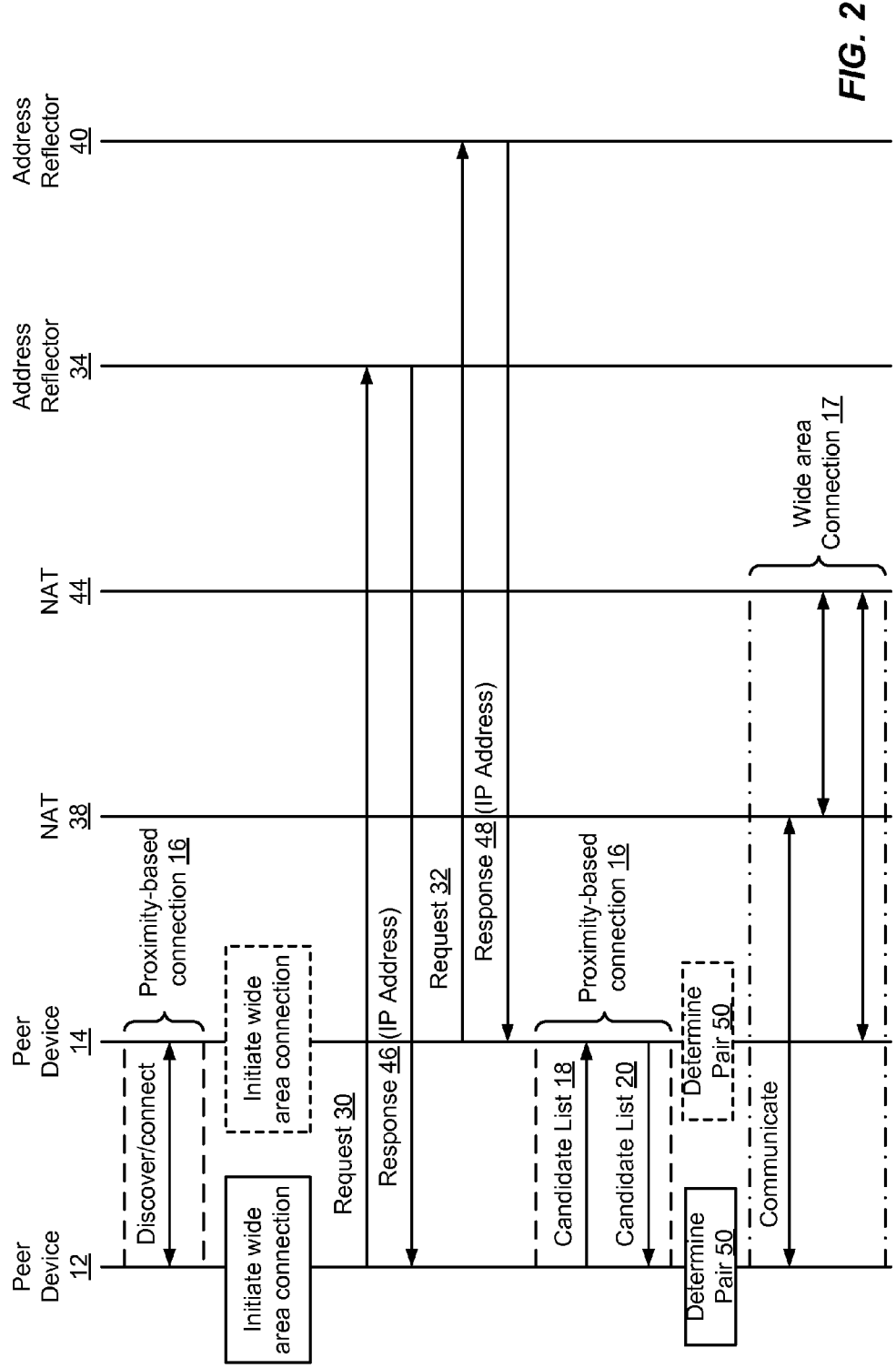
FIG. 2 is a message flow diagram of an aspect of peer-to-peer communication corresponding to FIG. 1.
Figure 3:
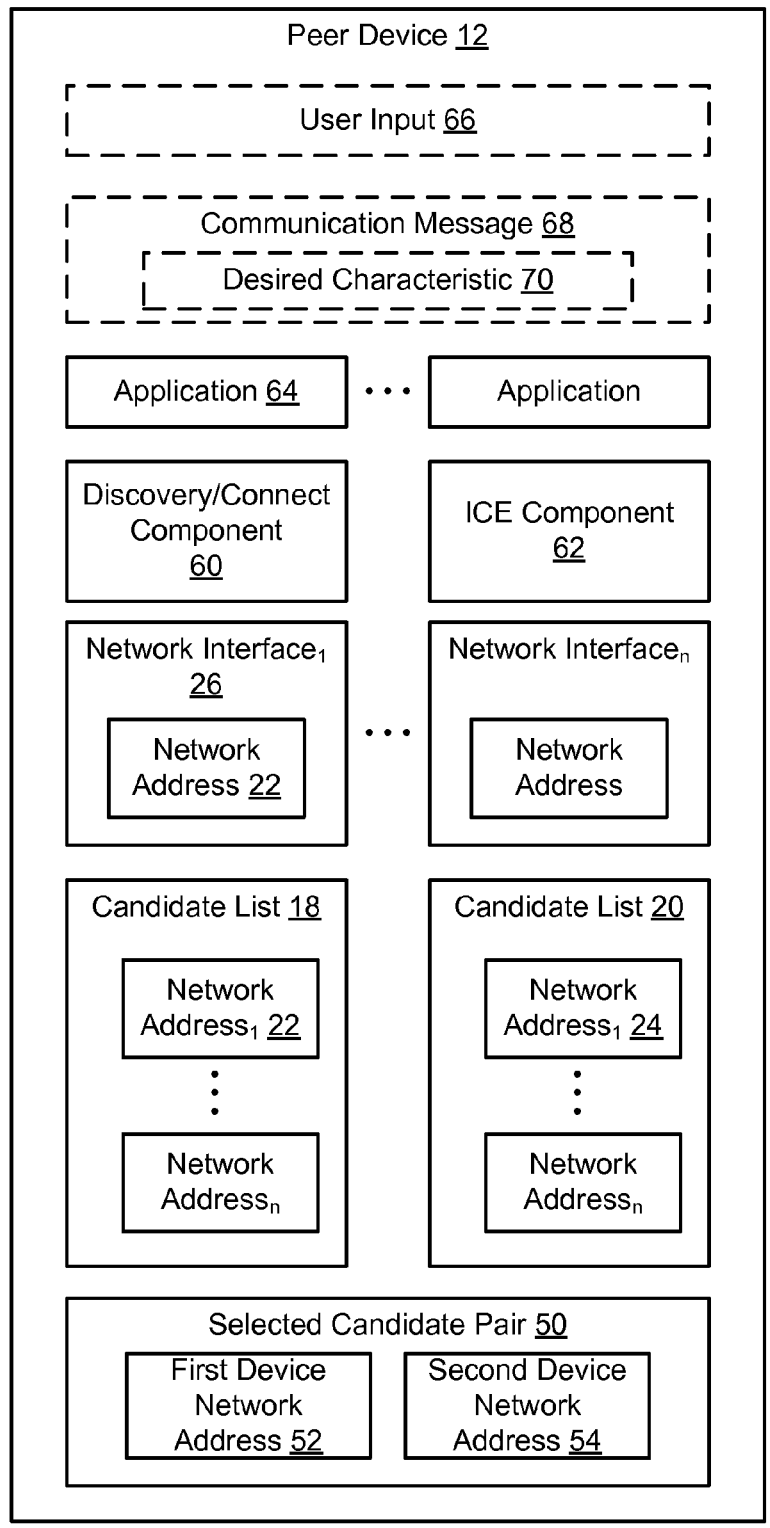
FIG. 3 is a schematic diagram of an aspect of a portion of a logical architecture of a peer device of FIG. 1.

Referring to FIG. 2, in an aspect, peer device 12 includes components for performing the above-described functionality. Although FIG. 2 describes peer device 12, it should be understood that peer device 14 may include substantially similar components. For example, peer device 12 may include a discovery and connect component 60 that includes logic configured to execute a service discovery protocol and establish proximity-based connection 16 (FIG. 1) via one of the network interfaces 26.

Further, peer device 12 may include an ICE component 62 that includes logic configured to execute a connectivity protocol to determine selected candidate pair 50 from the plurality of network addresses 22 and 24 of candidate lists 18 and 20. ICE component 62 may iteratively test various combinations of network addresses 22 and 24 until a combination is found that allows for establishment of wide area connection 17 (FIG. 1) between peer device 12 and another peer device, such as peer device 14. In some aspects, ICE component 62 may include optimization algorithms, rules, heuristics, fuzzy logic or any other mechanism for selectively choosing pairs for testing or improving the efficiency in finding selected pair 50.

More specifically, in an aspect that should not be construed as limiting, ICE component 62 may generate candidates locally by examining each network interface that is present on the device. For each device, a "HOST CANDIDATE" is generated, and this is a direct connect option that works if the two devices are on the same subnet or if they are directly routable to each other. In addition, zero or more "SERVER REFLEXIVE" and "RELAYED" candidates may be generated. A server reflexive candidate is the external IP address and port of the outermost NAT device. This may be learned by querying a STUN server on the Internet. A relayed candidate is a TURN server which is used as a last resort to relay all the data traffic between the two devices. The ICE component 62 may order all of these candidates according to their desirability. In an aspect, HOST candidates are most desirable because they involve no extra hops in the data path. Further, in this aspect, Server reflexive candidates may be ordered next, followed by relayed candidates, which may be least desirable. The ICE component 62 may dictate how these candidates will be ordered so that both devices can try all the candidates in the same order.

In some aspects, ICE component 62 may establish wide area connection 17 (FIG. 1), while in other aspects discovery and connect component 60 may establish wide area connection 17 using selected pair 50 identified by ICE component 62.

Further, in some aspects, discovery and connect component 60 and ICE component 62 may include computer readable instructions or other logic executable by a processor to perform the functionality described herein. The computer readable instructions may be software stored in a memory, firmware, or a hardware portion of processor.

Additionally, peer device 12 may include one or more software applications 64, which may utilize one or more network interfaces 26. Further, software applications 64 may automatically trigger discovery and connect component 60, or ICE component 62, or both. Moreover, software applications 64 may be interactive, and accordingly may receive a user input 66 from a user of peer device 12. In some aspects, user input 66 may trigger discovery and connect component 60, or ICE component 62, or both. For example, software applications 64 may include a gaming program, and the triggering of discovery and connect component 60, or ICE component 62, or both, may be based on a desire to establish a multi-player game. In other aspects, software applications 64 may include, but are not limited to, one or more applications such as a web browser, a telephony application, a multimedia application, a short message service, an instant messaging application, a position/location application such as a GPS service, a business application such as a word processor or a spreadsheet, or any other program executable by a computer device such as peer device 12. Further, in aspects where both wide area connection 17 (FIG. 1) and proximity-based connection 16 (FIG. 1) are maintained, service and discovery component 60 may include characteristic matching logic to manage communications by selecting one of the connections having a matching or closest fit actual communication characteristic corresponding to a desired communication characteristic 70 of a communication message 68 to be transmitted from the respective peer device.

Figure 4:
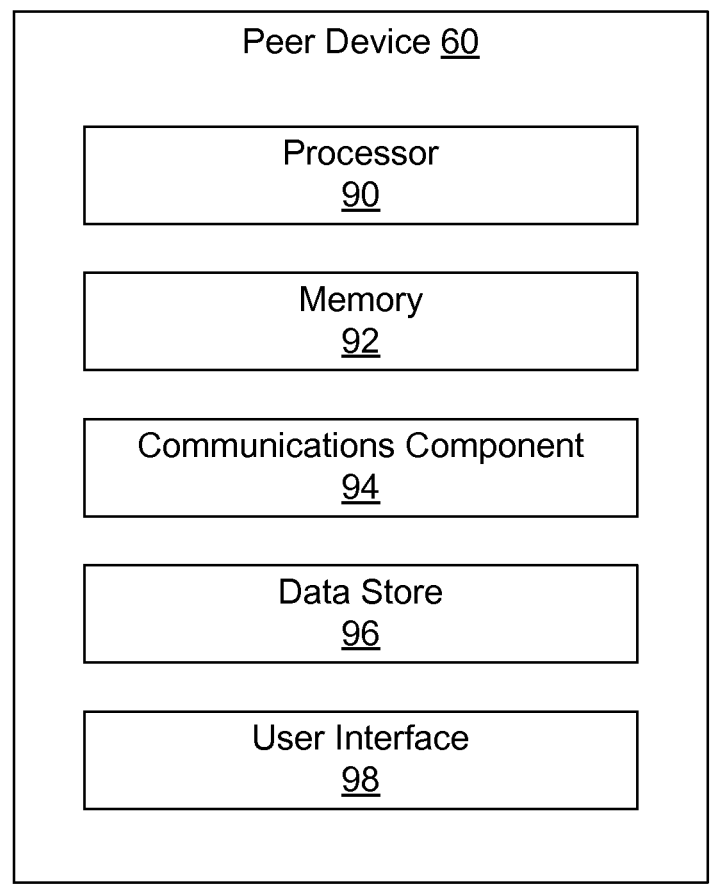
FIG. 4 is a schematic diagram of an aspect of another portion of a logical architecture of a peer device of FIG. 1.

Referring to FIG. 4, in one aspect, peer device 12 additionally includes a processor 90 for carrying out processing functions associated with one or more of the methods, components or functions described herein. For example, processor 90 can carry out one or more actions, such as executing instructions to establish a proximity-based connection for a first peer device, transmit a first public network address of the first peer device over the proximity-based connection, receive a second public network address associated with a second peer device over the proximity-based connection, and establish a communication session with the second peer device over the wide area connection using the first public network address and the second public network address. Optionally, in some aspects, processor 90 is configured to execute instructions to perform an ICE protocol, based on a resident candidate network address list and an second device candidate network address lists received via the proximity-based connection, in order to determine a selected candidate pair. Processor 90 can include a single or multiple set of processors or multi-core processors. Moreover, processor 90 can be implemented as an integrated processing system and/or a distributed processing system.

Peer device 12 may further include a memory 92, such as for storing local versions of applications 66, codes, instructions, components 60 and/or 62 or modules being executed by processor 90. Memory 92 can include any type of memory usable by a computer, such as random access memory (RAM), read only memory (ROM), tapes, magnetic discs, optical discs, volatile memory, non-volatile memory, and any combination thereof.

Further, peer device 12 may include a communications component 94 that provides for establishing and maintaining communications with one or more parties utilizing hardware, software, and services as described herein. Communications component 94 may carry communications between components on peer device 12, as well as between peer device 12 and external devices, such as devices located across a communications network and/or devices connected to access terminal 12 by wired or wireless links. For example, communications component 94 may include one or more buses, and may further include transmit chain components and receive chain components associated with a transmitter and receiver, respectively, or a transceiver, operable for interfacing with external devices. Further, for example, communications component 94 may include one or more network interfaces 26.

Additionally, peer device 12 may further include a data store 96, which can be any suitable combination of memory, that provides for mass storage of information, databases, and programs employed in connection with aspects described herein. For example, data store 96 may be a data repository for applications 66 not currently being executed by processor 92.

Access terminal 12 may additionally include a user interface component 98 operable to receive inputs from a user of access terminal 12, and further operable to generate outputs for presentation to the user. User interface component 98 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 98 may include one or more output devices, including but not limited to a display, a speaker, a haptic feedback mechanism, a printer, any other mechanism capable of presenting an output to a user, or any combination thereof.

Figure 5:
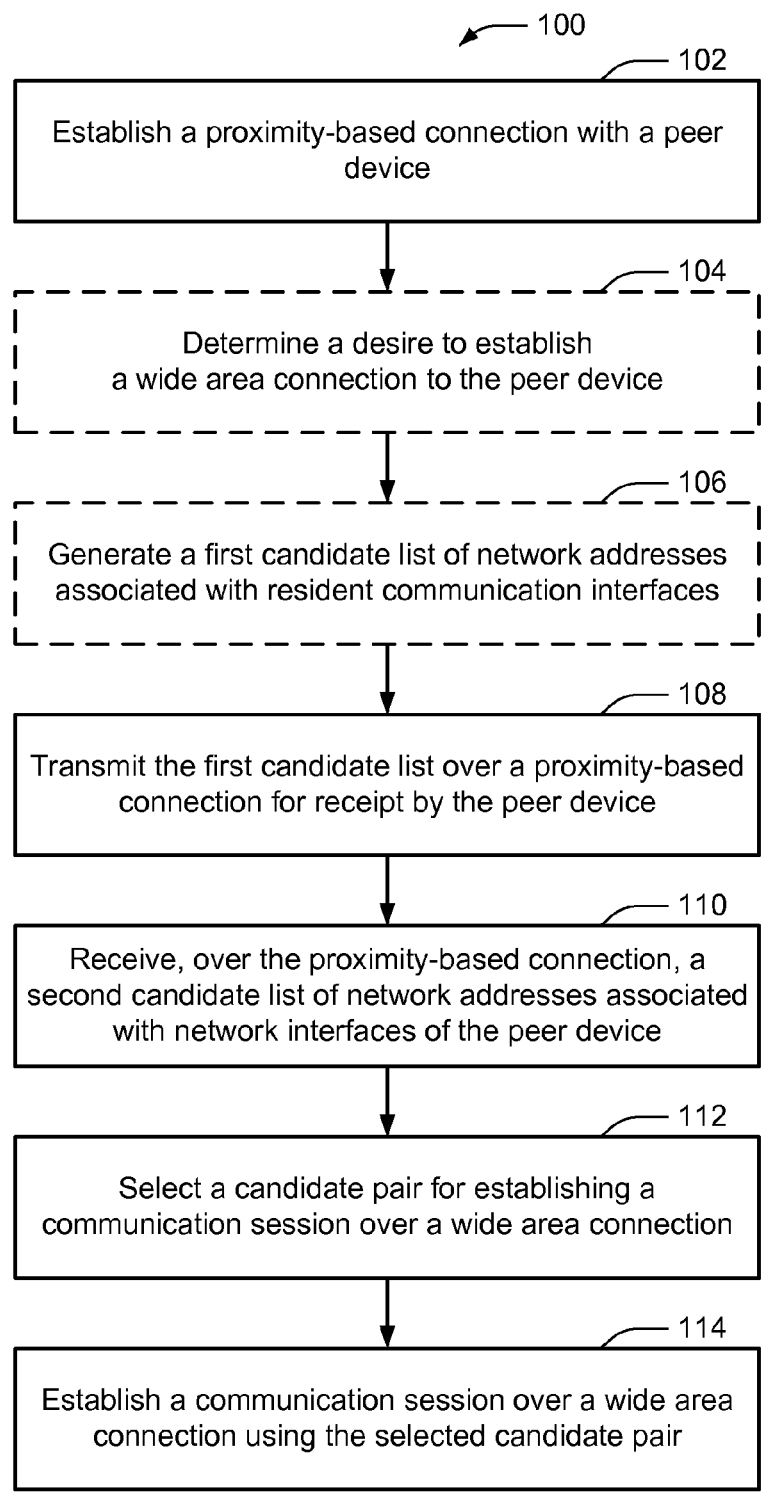
FIG. 5 is a flowchart of an aspect of a method of communication operable in the system of FIG. 1.

Referring to FIG. 5, in operation, in an aspect, a method 100 of peer-to-peer communication includes establishing a proximity-based connection with a peer device (Block 102).

For example, method 100 may be operable by a first peer device to connect to a second peer device, which is initially discovered within the proximity or communication range of the first peer device. For example, in an aspect, the proximity-based connection may be established according to a protocol, such as a service discovery protocol, operating in conjunction with one or more network interfaces. Such a protocol may include a Bluetooth® protocol, a Peanut® protocol, a Zigbee® protocol, or any other proximity-based service discovery and connection protocol. Such a protocol may be executed by a processor in connection with an operation of a network interface or a communications component, or the establishing may be performed by executing any processor-executable instructions configured to perform the described functionality.

Optionally, the method may further include determining a desire to establish a wide area connection to the peer device (Block 104). In some aspects, establishing of a wide area connection, or obtaining parameters in advance of such establishing, may be an automatic extension to establishing a proximity-based connection. In other aspects, a wide area connection is not established until a desire or triggering condition is determined. For example, in an aspect, a desire to establish a wide area connection may be based on a desire for increased bandwidth, e.g. if the bandwidth of the wide area connection is greater than the bandwidth of the proximity-based connection. Further, for example, in an aspect, a desire to establish a wide area connection may be based on a desire to extend a distance between the two devices yet maintain a communications connection between the two devices. Additionally, for example, in an aspect, a desire to establish a wide area connection may be based on launching of an IP-based application, e.g. an application that utilizes an IP address of the peer device as a destination for routing data packets. In some aspects, the determining includes receiving a user input initiating a process to establish a wide area connection, while in other aspects the determining includes automatically initiating the establishment of the wide area connection to meet an application requirement, or based on an application that monitors a distance between the devices and predicts that the proximity-based connection is approaching a maximum range based on a relative movement or a predicted relative movement of the devices, or based on a processor-executable instruction associated with a component on the peer device, such as a communications component.

Optionally, the method may further include generating a first candidate list of network addresses associated with resident network interfaces (Block 106). In some aspects, the first candidate list may already be resident on the peer device, such as from prior attempts to establish a wide area connection with a peer device. In other optional aspects, the first candidate list may need to be generated or updated or unknown network addresses may be obtained to complete a listing. The generating of the first candidate list may include gathering known network addresses, as well as obtaining network addresses from another device. In some aspects, a peer device may only know a private network address, for example, which may only be operable to route data to the peer device when used within a given network or subnetwork. In such cases, the generating of the first candidate list may include sending a request to an address reflector service in order to obtain a public network address that corresponds to the private network address. The public network address allows data from outside of the respective network to be routed to the peer device within the network. As such, the first candidate list may include a plurality of network addresses each associated with a network interface, where such addresses may include a local area network address, a wide area network address, a wired interface network address, and any other type of network address. A peer device may include one or more of a communications component, a discovery and connection component, or an interactive connectivity establishment component that may include processor-executable instructions for performing the generating of the first candidate list.

Also, the method includes transmitting a first candidate list over a proximity-based connection for receipt by the peer device (Block 108). For example, the transmitting includes transmitting via the network interface associated with the proximity-based connection to the peer device. In some aspects, for example, the transmitting may be initiated by a component on the device controlling establishment of the wide area connection, such as a communications component, a service discovery and connection component, an interactive connectivity establishment component, or any other communications-related component. Further, the transmitting may be performed by execution of a communications component, a transmitter, a transceiver, or any processor-executable instructions configured to perform the described functionality.

Further, the method includes receiving, via the proximity-based connection, a second candidate list of network addresses associated with network interfaces of the peer device (Block 110). For example, the receiving includes receiving via the network interface associated with the proximity-based connection to the peer device. Further, the receiving may be performed by execution of a communications component, a receiver, a transceiver, or any processor-executable instructions configured to perform the described functionality.

Also, the method includes selecting a candidate pair for establishing a communication session over a wide area connection (Block 112). For example, in an aspect, the selecting includes selecting a first network address from the first candidate list associated with a first peer device, and selecting a second network address from the second candidate list associated with a second peer device. Additionally, the selecting of the candidate pair may be a result of an iterative process of attempting to establish a wide area connection by choosing different combinations of network addresses from the first candidate list and the second candidate list. In some aspects, the selected first device address may be an origination address corresponding to the network interface from which the establishment of the wide area connection is attempted, and the selected second device address may be a destination address for the communication. Also in addition, or optionally, the selecting may further include iteratively attempting different address combinations based on an optimization algorithm, heuristics, rules, fuzzy logic, etc., configured to reduce a time to determine an acceptable candidate pair. The selecting may be performed by execution of an interactive connectivity establishment component, a communications component, a service discovery component, or any processor-executable instructions configured to perform the described functionality.

Additionally, the method includes establishing a communication session over a wide area connection using the selected candidate pair (Block 114). For example, the establishing may include performing a communication protocol corresponding to a network interface to enable a connection to be established and maintained. Further, for example, as noted above, the selected candidate pair may include the use of a first device network address as an original address, and use of the second device network address as a destination address for communications originating from the first peer device. The establishing may be performed by execution of an interactive connectivity establishment component, a communications component, a service discovery component, or any processor-executable instructions configured to perform the described functionality.

Thus, method 100 enables a peer device initially connected to another peer device via a proximity-based connection to alternatively or additionally establish a wide area connection though exchanging candidate lists over the proximity-based connection and determining a selected candidate pair for use in the wide area connection.

Figure 6:
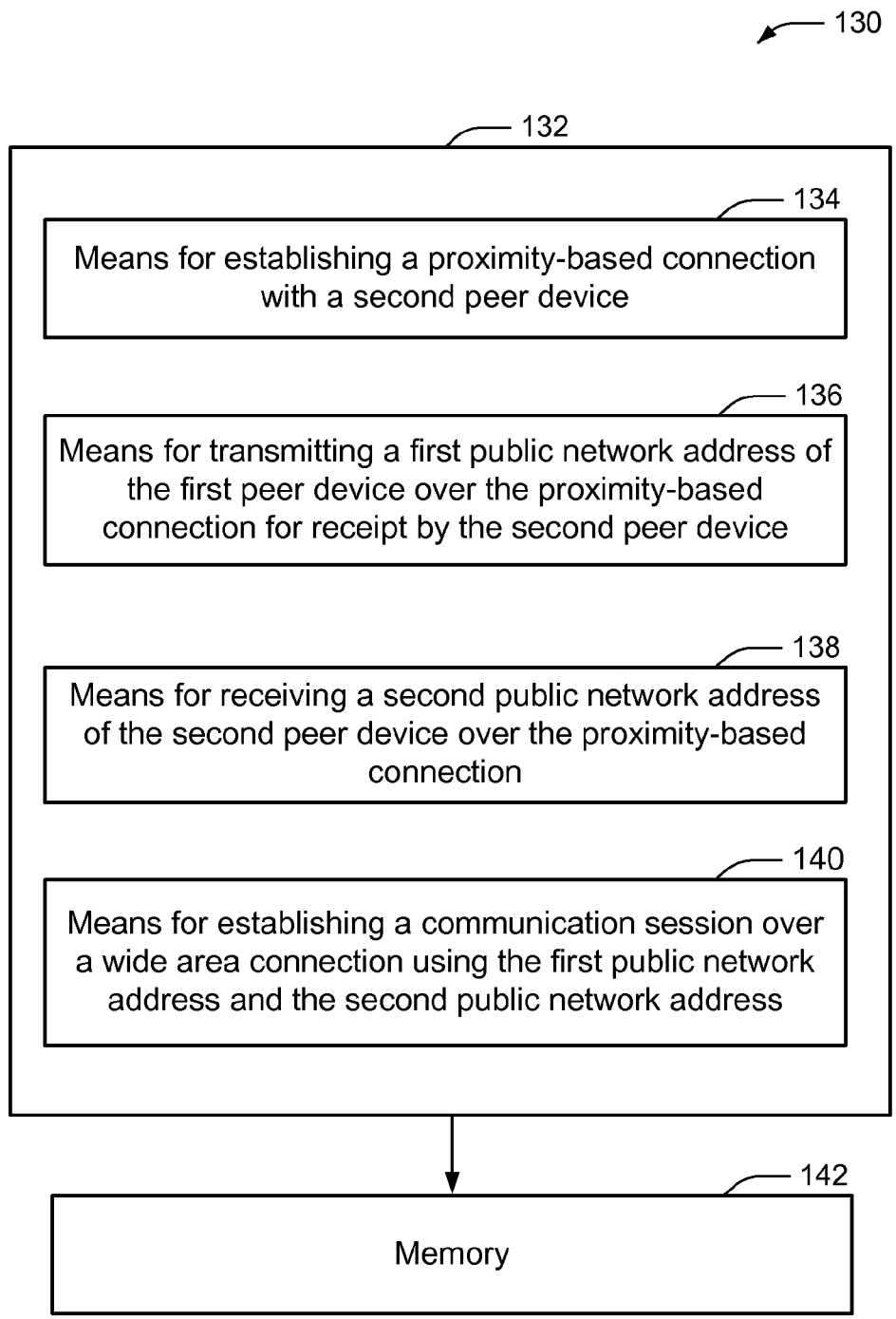
FIG. 6 is a schematic diagram of an aspect of a system of communication as described herein.

Referring to FIG. 6, in some cases, the described aspects include a system 130 for enabling a peer devices initially connected to another peer device via a proximity-based connection to alternatively or additionally establish a wide area connection though exchanging candidate lists over the proximity-based connection and determining a selected candidate pair for use in the wide area connection. For example, system 130 can at least partially reside within peer device. It is to be appreciated that system 130 is represented as including functional blocks, which can be functional blocks that represent functions implemented by a processor, software, or a combination thereof (e.g., firmware).

System 130 includes a logical grouping 132 of means that can act in conjunction. For instance, logical grouping 132 can include means for establishing a proximity-based connection with a second peer device (Block 134). The logical grouping 132 can also include means for transmitting a first public network address of the first peer device over the proximity-based connection for receipt by the second peer device (Block 136). Further, logical grouping 132 can include means for receiving a second public network address of the second peer device over the proximity-based connection (Block 138). Additionally, the logical grouping 592 can include means for establishing a communication session over a wide area connection using the first public network address and the second public network address (Block 140).

Additionally, system 130 can include a memory 142 that retains instructions for executing functions associated with the means 134, 136, 138 and 140. While shown as being external to memory 142, it is to be understood that one or more of the means 134, 136, 138 and 140 can exist within memory 142.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, Bluetooth® and any other short- or long-range, wireless communication techniques.

Various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of non-transitory storage medium known in the art. An exemplary non-transitory storage medium may be coupled to the processor, such that the processor can read information from, and write information to, the storage medium. In the alternative, the non-transitory storage medium may be integral to the processor. Further, in some aspects, the processor and the non-transitory storage medium may reside in an ASIC. Additionally, the ASIC may reside in a user terminal. In the alternative, the processor and the non-transitory storage medium may reside as discrete components in a user terminal. Additionally, in some aspects, the steps and/or actions of a method or algorithm may reside as one or any combination or set of codes and/or instructions on a machine readable medium and/or computer readable medium, which includes a non-transitory medium, and which may be incorporated into a computer program product.

In one or more aspects, the functions described may be implemented in hardware, software, firmware, or any combination thereof. If implemented in software, the functions may be stored or transmitted as one or more instructions or code on a non-transitory computer-readable medium. A non-transitory storage medium may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of non-transitory computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of communication by a first communication device, comprising:
   establishing, by the first communication device, a proximity-based connection with a second communication device without using a centrally administered network component, wherein the proximity-based connection is out-of-band of a TCP/IP connection and established based on the first communication device and the second communication device being within a predefined distance from each other;
   determining a trigger condition to establish a wide area connection between the first communication device and the second communication device, wherein the wide area connection utilizes a TCP/IP protocol;
   generating, by the first communication device, a first candidate network address list comprising network addresses associated with each network interface of the first communication device,
   a host candidate address of the first communication device that is used when the first communication device communicates with a communication device on a same subnet as the first communication device and is not separated by a network address translation device; and
   a server reflexive candidate address of the first communication device that is used when the first communication device communicates with a communication device on a different subnet than the first communication device and is separated by at least one network address translation device, the server reflexive candidate address of the first communication device learned by the first communication device querying a first STUN server external to a first network address translation device arranged between the first communication device and the public Internet;
   transmitting, by the first communication device, the first candidate network address list to the second communication device directly over the proximity-based connection without using a centrally administered network component;
   receiving, by the first communication device, a second candidate network address list from the second communication device transmitted directly over the proximity-based connection without using a centrally administered network component, wherein the second candidate network address list includes at least:
   a host candidate address of the second communication device that is used when the second communication device communicates with a communication device on a same subnet as the second communication device and is not separated by a network address translation device; and
   a server reflexive candidate address of the second communication device that is used when the second communication device communicates with a communication device on a different subnet than the second communication device and is separated by at least one network address translation device, the server reflexive candidate address of the second communication device learned by the second communication device querying a second STUN server external to a second network address translation device arranged between the second communication device and the public Internet;

performing iterative attempts to establish the wide area connection between the first communication device and the second communication device using different combination pairs of addresses from the first candidate network address list and the second candidate network address list to determine that the wide area connection can be established between an acceptable candidate pair;

establishing, by the first communication device, a communication session between the first communication device and the second communication device over the wide area connection using the acceptable candidate pair, the acceptable candidate pair comprising a first public network address selected from the first candidate network address list and a second public network address selected from the second candidate network address list, and wherein at least one of the first public network address and the second public network address of the acceptable candidate pair is the server reflexive candidate address of the first communication device or the server reflexive candidate address of the second communication device transmitted or received over the proximity-based connection;

maintaining both the proximity-based connection and the wide area connection, wherein the proximity-based connection and the wide area connection differ in their communication characteristics; and for each communication message between the first communication device and the second communication device, selecting one of the proximity-based connection or the wide area connection for transmission of the communication message based on a closest match between a communication characteristic of the communication message and the communication characteristics of each of the proximity-based connection and the wide area connection.

2. The method of claim 1, further comprising:

transmitting, by the first communication device, a third public network address of the first communication device over the proximity-based connection in response to determining that the wide area connection can be established using the first public network address and the second public network address;

receiving, by the first communication device, a fourth public network address over the proximity-based connection; and iteratively trying to identify a candidate pair that can be used to establish the wide area connection starting with the third public network address and the fourth public network address.

3. The method of claim 1, further comprising receiving, by the first communication device, a user input corresponding to a desired communication characteristic, wherein, the desired communication characteristic corresponds to one of the wide area connection and the proximity-based connection;

and the user input is used to determine across which of the wide area connection and the proximity-based connection to transmit data.

4. The method of claim 3, further comprising executing an application on the first communication device associated with the desired communication characteristic, and wherein the trigger condition is automatically triggered from the executing of the application.

5. The method of claim 3, further comprising receiving, by the first communication device, a wide area communication request from the second communication device, wherein the trigger condition is based on the received wide area communication request.

6. The method of claim 1, further comprising releasing the proximity-based connection after establishing the communication session over the wide area connection and maintaining the communication session for a particular period of time.

7. The method of claim 1, further comprising:

selecting one of the proximity-based connection and the wide area connection for transmission of each communication message based on a desirability of transmitting the communication message over a TCP/IP protocol.

8. A first communication device, comprising:

a first transceiver configured to communicate with one or more other communication devices over a proximity-based connection, the proximity-based connection not using a centrally administered network component, and wherein the proximity-based connection is out-of-band of a TCP/IP connection and established based on the first communication device and a second communication device being within a predefined distance from each other;

a second transceiver configured to communicate over a wide area connection when the first communication device determines a trigger condition to establish the wide area connection between the first communication device and the second communication device, wherein the wide area connection utilizes a TCP/IP protocol; and a processor coupled to the first transceiver and the second transceiver, wherein the processor is configured with processor-executable instructions to perform operations comprising:

establishing the proximity-based connection using the first transceiver;

generating, by the first communication device, a first candidate network address list comprising network addresses associated with each network interface of the first communication device, where the first candidate network address list includes at least:

a host candidate address of the first communication device that is used when the first communication device communicates with a communication device on a same subnet as the first communication device and is not separated by a network address translation device, and a server reflexive candidate address of the first communication device that is used when the first communication device communicates with a communication device on a different subnet than the first communication device and is separated by at least one network address translation device, the server reflexive candidate address of the first communication device learned by the first communication device querying a first STUN server external to a first network address translation device arranged between the first communication device and the public Internet;

transmitting, by the first communication device, the first candidate network address list to the second communication device directly over the proximity-based connection without using a centrally administered network component;

receiving, at the first communication device, a second candidate network address list from the second communication device transmitted directly over the proximity-based connection without using a centrally administered network component, wherein the second candidate network address list includes at least:
- a host candidate address of the second communication device that is used when the second communication device communicates with a communication device on a same subnet as the second communication device and is not separated by a network address translation device; and
- a server reflexive candidate address of the second communication device that is used when the second communication device communicates with a communication device on a different subnet than the second communication device and is separated by at least one network address translation device, the server reflexive candidate address of the second communication device learned by the second communication device querying a second STUN server external to a second network address translation device arranged between the second communication device and the public Internet;

performing iterative attempts to establish the wide area connection between the first communication device and the second communication device using different combination pairs of addresses from the first candidate network address list and the second candidate network address list to determine that the wide area connection can be established between an acceptable candidate pair;

establishing a communication session between the first communication device and the second communication device over the wide area connection via the second transceiver using the acceptable candidate pair, the acceptable candidate pair comprising a first public network address selected from the first candidate network address list and a second public network address selected from the second candidate network address list, and wherein at least one of the first public network address and the second public network address of the acceptable candidate pair is the server reflexive candidate address of the first communication device or the server reflexive candidate address of the second communication device transmitted or received over the proximity-based connection;

maintaining both the proximity-based connection and the wide area connection, wherein the proximity-based connection and the wide area connection differ in their communication characteristics; and for each communication message between the first communication device and the second communication device, selecting one of the proximity-based connection or the wide area connection for transmission of the communication message based on a closest match between a communication characteristic of the communication message and the communication characteristics of each of the proximity-based connection and the wide area connection.

9. The first communication device of claim 8, wherein the processor is configured with processor-executable instructions to perform operations further comprising:
- transmitting a third public network address of the first communication device over the proximity-based connection in response to determining that the wide area connection can be established using the first public network address and the second public network address;
- receiving a fourth public network address over the proximity-based connection; and
- utilizing the third public network address and the fourth public network address to determine if the wide area connection can be established.

10. The first communication device of claim 8, wherein the processor is configured with processor-executable instructions to perform operations such that selecting the acceptable candidate pair further comprises iteratively selecting until a respective candidate pair of network addresses that enables the wide area connection is found.

11. The first communication device of claim 8, further comprising a user interface component coupled to the processor, wherein the processor is configured with processor executable instructions to perform operations further comprising,
- receiving via the user interface component a user input corresponding to a desired communication characteristic, wherein the desired communication characteristic corresponds to one of the wide area connection and the proximity-based connection; and
- the user input is used to determine across which of the wide area connection and the proximity-based connection to transmit data.

12. The first communication device of claim 8, wherein the processor is configured with processor executable instructions to perform operations further comprising,
- executing an application on the first communication device associated with a desired communication characteristic corresponding to the wide area connection; and
- wherein the processor is configured with processor-executable instructions to perform operations such that the trigger condition is triggered from the executing of the application.

13. The first communication device of claim 8, wherein the processor is configured with processor executable instructions to perform operations further comprising receiving a wide area communication request, and
- wherein the processor is configured with processor-executable instructions to perform operations such that the trigger condition is based on the received wide area communication request.

14. The first communication device of claim 8, wherein the processor is configured with processor executable instructions to perform operations further comprising releasing the proximity-based connection after establishing the communication session over the wide area connection and maintaining the communication session for a particular period of time.

15. The first communication device of claim 8, wherein the processor is configured with processor executable instructions to perform operations further comprising:
- selecting one of the proximity-based connection and the wide area connection for transmission of each communication message based on a desirability of transmitting the communication message over a TCP/IP protocol.

16. A non-transitory, tangible processor-readable storage medium having stored thereon processor-executable instructions configured to cause a processor of a first communication device to perform operations comprising:
- establishing a proximity-based connection with a second communication device without using a centrally administered network component, wherein the proximity-based connection is out-of-band of a TCP/IP connection and established based on the first communication device and the second communication device being within a predefined distance from each other;

determining a trigger condition to establish a wide area connection between the first communication device and the second communication device, wherein the wide area connection utilizes a TCP/IP protocol;

generating, by the first communication device, a first candidate network address list comprising network addresses associated with each network interface of the first communication device, wherein the first candidate network address list includes at least:

a host candidate address of the first communication device that is used when the first communication device communicates with a communication device on a same subnet as the first communication device and is not separated by a network address translation device; and a server reflexive candidate address of the first communication device that is used when the first communication device communicates with a communication device on a different subnet than the first communication device and is separated by at least one network address translation device, the server reflexive candidate address of the first communication device learned by the first communication device querying a first STUN server external to a first network address translation device arranged between the first communication device and the public Internet;

transmitting, by the first communication device, the first candidate network address list to the second communication device directly over the proximity-based connection without using a centrally administered network component;

receiving, by the first communication device, a second candidate network address list from the second communication device transmitted directly over the proximity-based connection without using a centrally administered component, wherein the second candidate network address list includes at least:

a host candidate address of the second communication device that is used when the second communication device communicates with a communication device on a same subnet as the second communication device and is not separated by a network address translation device; and a server reflexive candidate address of the second communication device that is used when the second communication device communicates with a communication device on a different subnet than the second communication device and is separated by at least one network address translation device, the server reflexive candidate address of the second communication device learned by the second communication device querying a second STUN server external to a second network address translation device arranged between the second communication device and the public Internet;

performing iterative attempts to establish the wide area connection between the first communication device and the second communication device using different combination pairs of addresses from the first candidate network address list and the second candidate network address list to determine that the wide area connection can be established between an acceptable candidate pair;

establishing, by the first communication device, a communication session between the first communication device and the second communication device over the wide area connection using the acceptable candidate pair, the acceptable candidate pair comprising a first public network address selected from the first candidate network address list and a second public network address selected from the second candidate network address list, and wherein at least one of the first public network address and the second public network address of the acceptable candidate pair is the server reflexive candidate address of the first communication device or the server reflexive address of the second communication device transmitted or received only over the proximity-based connection;

maintaining both the proximity-based connection and the wide area connection, wherein the proximity-based connection and the wide area connection differ in their communication characteristics; and for each communication message between the first communication device and the second communication device, selecting one of the proximity-based connection or the wide area connection for transmission of the communication message based on a closest match between a communication characteristic of the communication message and the communication characteristics of each of the proximity-based connection and the wide area connection.

17. The non-transitory, tangible processor-readable storage medium of claim 16, wherein the stored processor-executable instructions are configured to cause the processor of the first communication device to perform operations further comprising:

transmitting a third public network address of the first communication device over the proximity-based connection in response to determining that the wide area connection can be established using the first public network address and the second public network address;

receiving a fourth public network address over the proximity-based connection; and utilizing the third public network address and the fourth public network address to determine if the wide area connection can be established.

18. The non-transitory, tangible processor-readable storage medium of claim 16, wherein the stored processor-executable instructions are configured to cause the processor of the first communication device to perform operations such that selecting of the acceptable candidate pair comprises iteratively selecting until a respective candidate pair of network addresses that enables the wide area connection is found.

19. The non-transitory, tangible processor-readable storage medium of claim 16, wherein the stored processor-executable instructions are configured to cause the processor of the first communication device to perform operations further comprising, receiving a user input corresponding to a desired communication characteristic, wherein, the desired communication characteristic corresponds to one of the wide area connection and the proximity-based connection; and the user input is used to determine across which of the wide area connection and the proximity-based connection to transmit data.

20. The non-transitory, tangible processor-readable storage medium of claim 16, wherein the stored processor-executable instructions are configured to cause the processor of the first communication device to perform operations further comprising, executing an application on the first communication device associated with a desired communication characteristic wherein, the desired communication characteristic corresponds to one of the wide area connection and the proximity-based connection; and the executing of the application is used to determine across which of the wide area connection and the proximity-based connection to transmit data.

21. The non-transitory, tangible processor-readable storage medium of claim 16, wherein the stored processor-executable instructions are configured to cause the processor of the first communication device to perform operations further comprising, receiving a wide area communication request, and the received wide area communication request is used to determine across which of the wide area connection and the proximity-based connection to transmit data.

22. The non-transitory, tangible processor-readable storage medium of claim 16, wherein the stored processor-executable instructions are configured to cause the processor of the first communication device to perform operations further comprising releasing the proximity-based connection after establishing the communication session over the wide area connection and maintaining the communication session for a particular period of time.

23. The non-transitory, tangible processor-readable storage medium of claim 16, wherein the stored processor-executable instructions are configured to cause the processor of the first communication device to perform operations further comprising:

selecting one of the proximity-based connection and the wide area connection for transmission of each communication message based on a desirability of transmitting the communication message over a TCP/IP protocol.

\* \* \* \* \*